US012072769B2

(12) United States Patent
Verma et al.

(10) Patent No.: US 12,072,769 B2
(45) Date of Patent: Aug. 27, 2024

(54) AUTOMATICALLY HALTING CLOUD SERVICE DEPLOYMENTS BASED ON TELEMETRY AND ALERT DATA

(71) Applicant: Microsoft Technology Licensing, LLC, Redmond, WA (US)

(72) Inventors: Nidhi Verma, Bellevue, WA (US); Rahul Nigam, Bothell, WA (US); Sudharsan Ganesan, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 124 days.

(21) Appl. No.: 17/864,831

(22) Filed: Jul. 14, 2022

(65) Prior Publication Data
US 2024/0020199 A1 Jan. 18, 2024

(51) Int. Cl.
*G06F 11/14* (2006.01)
*G06F 8/65* (2018.01)

(52) U.S. Cl.
CPC ............ *G06F 11/1433* (2013.01); *G06F 8/65* (2013.01); *G06F 2201/84* (2013.01)

(58) Field of Classification Search
CPC ..... G06F 11/1433; G06F 8/65; G06F 2201/84
USPC .................................................. 717/120–178
See application file for complete search history.

(56) References Cited

U.S. PATENT DOCUMENTS

| 7,779,406 | B2* | 8/2010 | Blanding | G06F 8/65 |
| | | | | 717/172 |
| 7,865,888 | B1* | 1/2011 | Qureshi | G06N 5/048 |
| | | | | 717/170 |
| 8,856,289 | B2* | 10/2014 | Ansari | H04L 12/66 |
| | | | | 709/220 |
| 9,223,562 | B1* | 12/2015 | Sobel | G06F 8/65 |
| 9,900,299 | B2* | 2/2018 | Oppenheim, Jr. | G06F 16/2455 |
| 10,732,962 | B1* | 8/2020 | Florescu | G06F 11/0706 |

(Continued)

OTHER PUBLICATIONS

Hicks, Michael, Jonathan T. Moore, and Scott Nettles. "Dynamic software updating." ACM SIGPLAN Notices 36.5 (2001): pp. 13-23. (Year: 2001).*

(Continued)

*Primary Examiner* — Satish Rampuria
(74) *Attorney, Agent, or Firm* — Novo TechIP International PLLC

(57) ABSTRACT

A data processing system implements managing the deployment of updates to a cloud-based service by deploying an update to one or more components of a cloud-based service according to a deployment plan. The deployment plan defines a plurality of stages in which the update is deployed to a subset of the components associated with a different subset of users of a userbase. The system implements receiving signal data that includes information regarding the performance of the update at each stage of the deployment plan; analyzing the signal data to determine whether one or more trigger conditions of halt and recovery rules associated with the update have been satisfied; and automatically halting deployment of the update to the one or more components of the cloud-based service responsive to at least one of the trigger conditions associated with the halt and recovery rules associated with the update having been satisfied.

17 Claims, 8 Drawing Sheets

(56) References Cited

U.S. PATENT DOCUMENTS 11,140,029 B1 * 10/2021 Singhal ............... H04L 41/0893
11,687,438 B1 *  6/2023 Torbett ................ G06F 11/3428
                                                         702/186

OTHER PUBLICATIONS

Perkins, Jeff H., et al. "Automatically patching errors in deployed software." Proceedings of the ACM SIGOPS 22nd symposium on Operating systems principles. 2009.pp. 87-102. (Year: 2009).*

Parnin, Chris, et al. "The top 10 adages in continuous deployment." IEEE Software 34.3 (2017): pp. 86-95. (Year: 2017).*

Gerakos, Kostantinos, et al. "Motive-time-optimized contextual information flow on unmanned vehicles." Proceedings of the 19th ACM International Symposium on Mobility Management and Wireless Access. 2021.pp. 53-62 (Year: 2021).*

Demarne, Mathieu B., et al. "Reliability analytics for cloud based distributed databases." Proceedings of the 2020 ACM SIGMOD International Conference on Management of Data. 2020.pp. 1479-1492 (Year: 2020).*

Nikolaidis, Fotis, et al. "Frisbee: automated testing of Cloud-native applications in Kubernetes." arXiv preprint arXiv:2109.10727 ( 2021).pp. 1-14 (Year: 2019).*

* cited by examiner

AUTOMATICALLY HALTING CLOUD SERVICE DEPLOYMENTS BASED ON TELEMETRY AND ALERT DATA

BACKGROUND

Cloud-based services provide computing services over the Internet or a dedicated network. The cloud-based services may provide computing resources, analytics, storage, and network resources to customers. These services may include, but are not limited to applications for creating, consuming, and/or modifying content, file storage and management platforms, collaboration and communications platforms, and other types of software as a service. The architecture of a typical cloud-based service includes numerous servers, network devices, and storage elements to support the services provided. These devices include software, data, and configuration files that need to be periodically updated to add new features, to roll out fixes to software and/or configuration. Furthermore, some services may support software installed on the client devices, and this software may also need to be updated to a newer version to support added features and/or to fix problems associated with a current version of the software.

Updates are typically rolled out in multiple stages to different groups of users to mitigate the risk of deploying the new version of the software and/or configuration data. This approach is referred to as ring deployment. The deployment process is represented by an expanding series of rings, where each ring includes deploying the update to a larger subset of the userbase being provided access to the update. The underlying hardware and software that support the subset of the userbase associated with the ring is updated. User feedback and telemetry data may be collected from users associated with each ring to determine whether the new version of the software is operating correctly before deploying the updates to the next ring. This process may continue until the update are deployed across the entire userbase.

As the update is rolled out, problems with the update may be detected based on telemetry, log, and alert data that is generated by various components of the cloud-based services. Currently, when such problems are detected, user intervention is typically required to halt deployment of the update across the cloud-based services and to implement a solution to restore the updated components to a previous working version of the software and/or configuration data that was updated. Consequently, recovering from a problematic update that impacts one or more subsystems of the cloud-based service may be a time consuming and manual process. Hence, there is a need for improved systems and methods for detecting problems when deploying updates to cloud services, for halting deployment of the update to further components of the cloud-based service, and for recovering updated components of the cloud-based service.

SUMMARY

An example data processing system according to the disclosure may include a processor and a machine-readable medium storing executable instructions. The instructions when executed cause the processor to perform operations including deploying an update to one or more components of a cloud-based service according to a deployment plan, the deployment plan defining a plurality of stages in which the update is deployed to a subset of the components associated with a different subset of users of a userbase; receiving signal data that includes information regarding the performance of the update at each stage of the deployment plan; analyzing the signal data to determine whether one or more trigger conditions of halt and recovery rules associated with the update have been satisfied; and automatically halting deployment of the update to the one or more components of the cloud-based service responsive to at least one of the trigger conditions associated with the halt and recovery rules associated with the update having been satisfied.

An example method implemented in a data processing system for deploying updates to a cloud-based service includes deploying an update to one or more components of a cloud-based service according to a deployment plan, the deployment plan defining a plurality of stages in which the update is deployed to a subset of the components associated with a different subset of users of a userbase; receiving signal data that includes information regarding the performance of the update at each stage of the deployment plan; analyzing the signal data to determine whether one or more trigger conditions of halt and recovery rules associated with the update have been satisfied; and automatically halting deployment of the update to the one or more components of the cloud-based service responsive to at least one of the trigger conditions associated with the halt and recovery rules associated with the update having been satisfied.

An example machine-readable medium on which are stored instructions. The instructions when executed cause a processor of a programmable device to perform operations of deploying an update to one or more components of a cloud-based service according to a deployment plan, the deployment plan defining a plurality of stages in which the update is deployed to a subset of the components associated with a different subset of users of a userbase; receiving signal data that includes information regarding the performance of the update at each stage of the deployment plan; analyzing the signal data to determine whether one or more trigger conditions of halt and recovery rules associated with the update have been satisfied; and automatically halting deployment of the update to the one or more components of the cloud-based service responsive to at least one of the trigger conditions associated with the halt and recovery rules associated with the update having been satisfied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for monitoring and controlling the deployment of updates in cloud-based services for improved reliability of the cloud-based services are provided. The techniques solve the technical problem of identifying and automatically recovering from problems that are detected as an update is deployed across the cloud-based services. These techniques include monitoring of performance log data, telemetry data, alert data, and/or other information that represents the performance of the update across the cloud-based services to identify regressions that have been introduced by the update. A regression occurs when an update to the software and/or configuration data of the cloud-based services introduces an error that causes a feature of the software that was previously working to stop working. The techniques provided herein provide a flexible solution for detecting such regressions, halting the deployment of the update, and performing various recovery actions on the components of the cloud-based service to which the update was deployed. An administrator may define deployment halt and recovery rules that define actions to be taken when specified trigger conditions occur in response to the update being deployed on the cloud-based service. This approach enables the response to be tailored to the specific software and/or other components of the cloud-based service being updated, the risk to the customer experience associated with the particular update, the age and type of the codebase being updated, the severity of the issues detected based on the performance logs, telemetry data, and/or alert data, and/or other factors. A technical benefit of this approach is that problems resulting from the update that may negatively impact the user experience can be rapidly detected and appropriate remedial measures an automatically be initiated to prevented to halt the deployment and recover the cloud-based services. A technical benefit of this approach is a significantly improved the user experience for users of the cloud-based service by ensuring that updates improve the functionality and stability of the cloud-based service. These and other technical benefits of the techniques disclosed herein will be evident from the discussion of the example implementations that follow.

Figure 1:
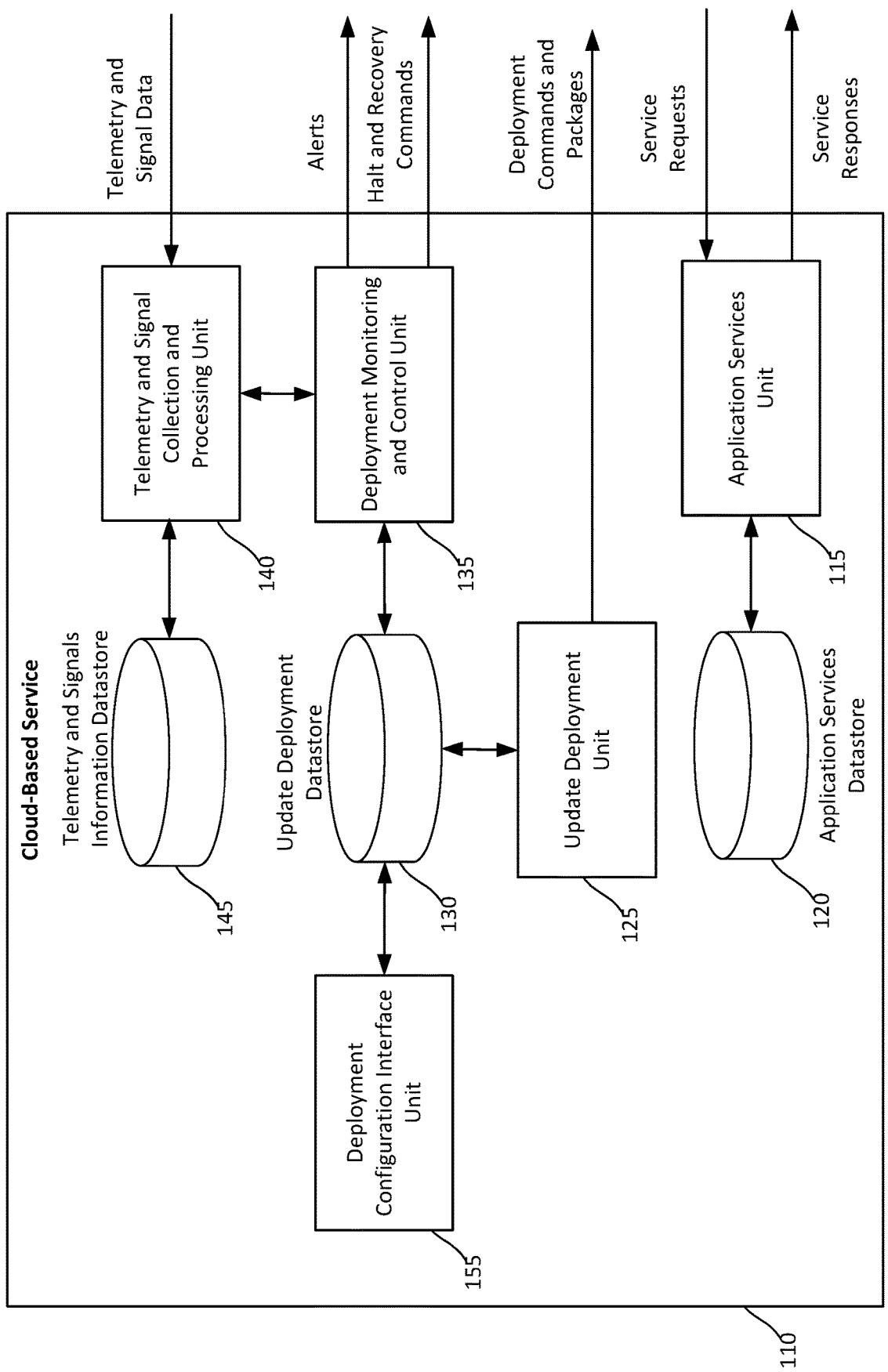
FIG. 1 is a diagram showing an example cloud-based service in which the techniques herein may be implemented.

FIG. 1 is a diagram showing an example cloud-based service 110 in which the techniques herein may be implemented. The cloud-based service 110 includes an application services unit 115 and an application services datastore 120. The cloud-based service 110 also includes an update deployment unit 125, an update deployment datastore 130, a deployment configuration interface unit 155, a deployment monitoring and control unit 135, a telemetry and signal collection and processing unit 140, and telemetry and signals information datastore 145.

The application services unit 115 may be configured to provide the various services offered to users of the cloud-based service 110. The application services unit 115 may be configured to receive service requests from the client devices of users and to provide service responses to the client devices of the users. The specific types of services provided by the cloud-based service 110 may vary. These services may include, but are not limited to, providing applications for creating, consuming, and/or modifying content, file storage and management platforms, collaboration and communications platforms, and other types of software as a service. The application services unit 115 stores data associated with the various services provide in the application services datastore 120.

Figure 4:
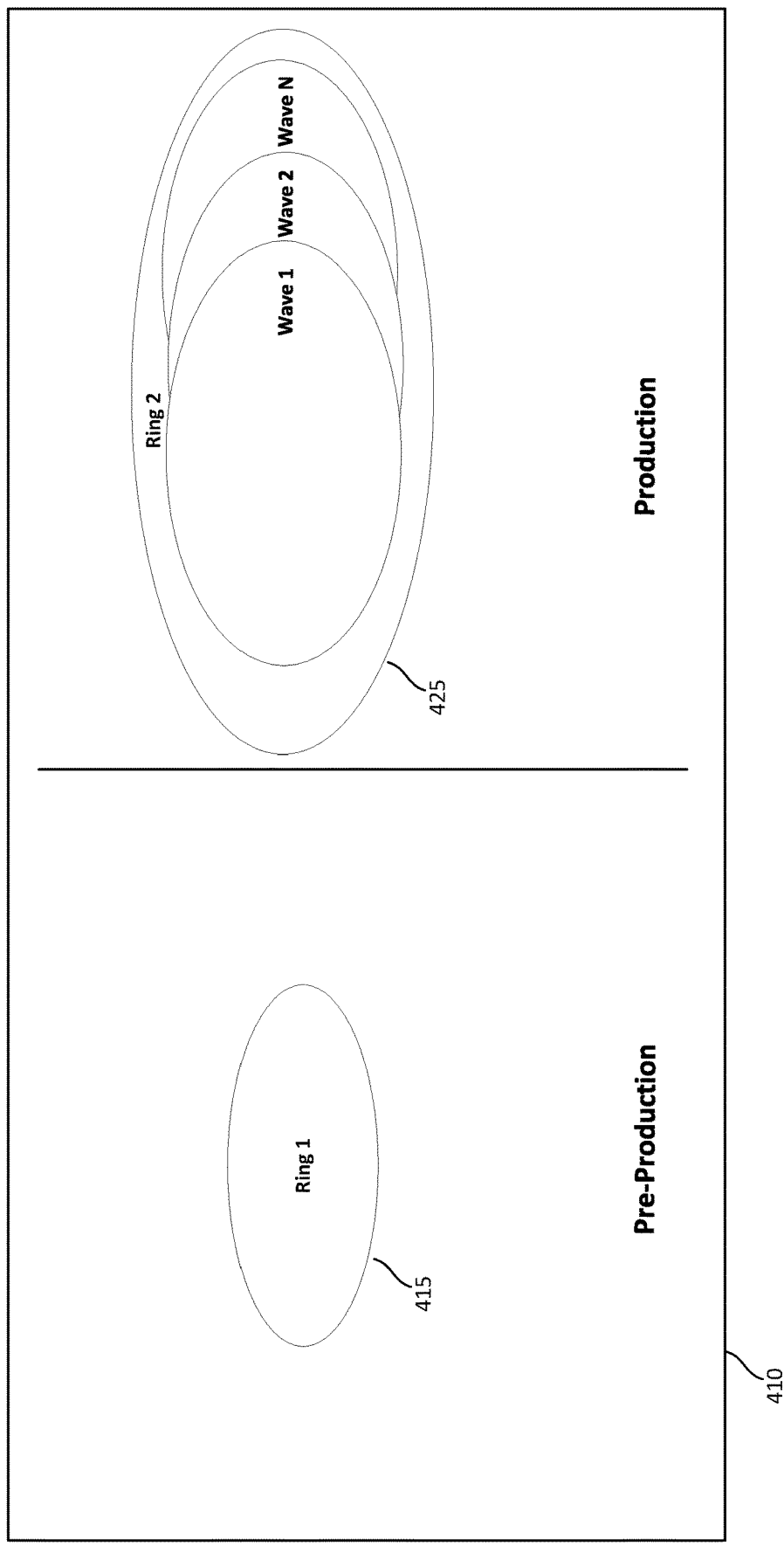
FIG. 4 is a diagram showing a representation of a ring configuration for deploying updates on a cloud-based architecture, such as that of the cloud-based service shown in FIG. 1.

The update deployment unit 125 is configured to facilitate deployment of according to the deployment configuration information provided by a user via the user interface provided by the deployment configuration interface unit 155. The update deployment unit 125 is configured to provide software and/or configuration data associated with the update to various components of the cloud-based service 110 incrementally. In some implementations, the deployment of the software and/or configuration data is performed using a ring deployment approach in which the deployment process is represented by an expanding set of rings in which each ring includes deploying the updates to a larger subset of the userbase being provided access to the update. An example of such a ring deployment is shown in FIG. 4 and is discussed in detail in the examples which follow. The update deployment unit 125 is configured to send deployment commands and/or packages of software and/or configuration data to various components of the cloud-based service 110.

Figure 5:
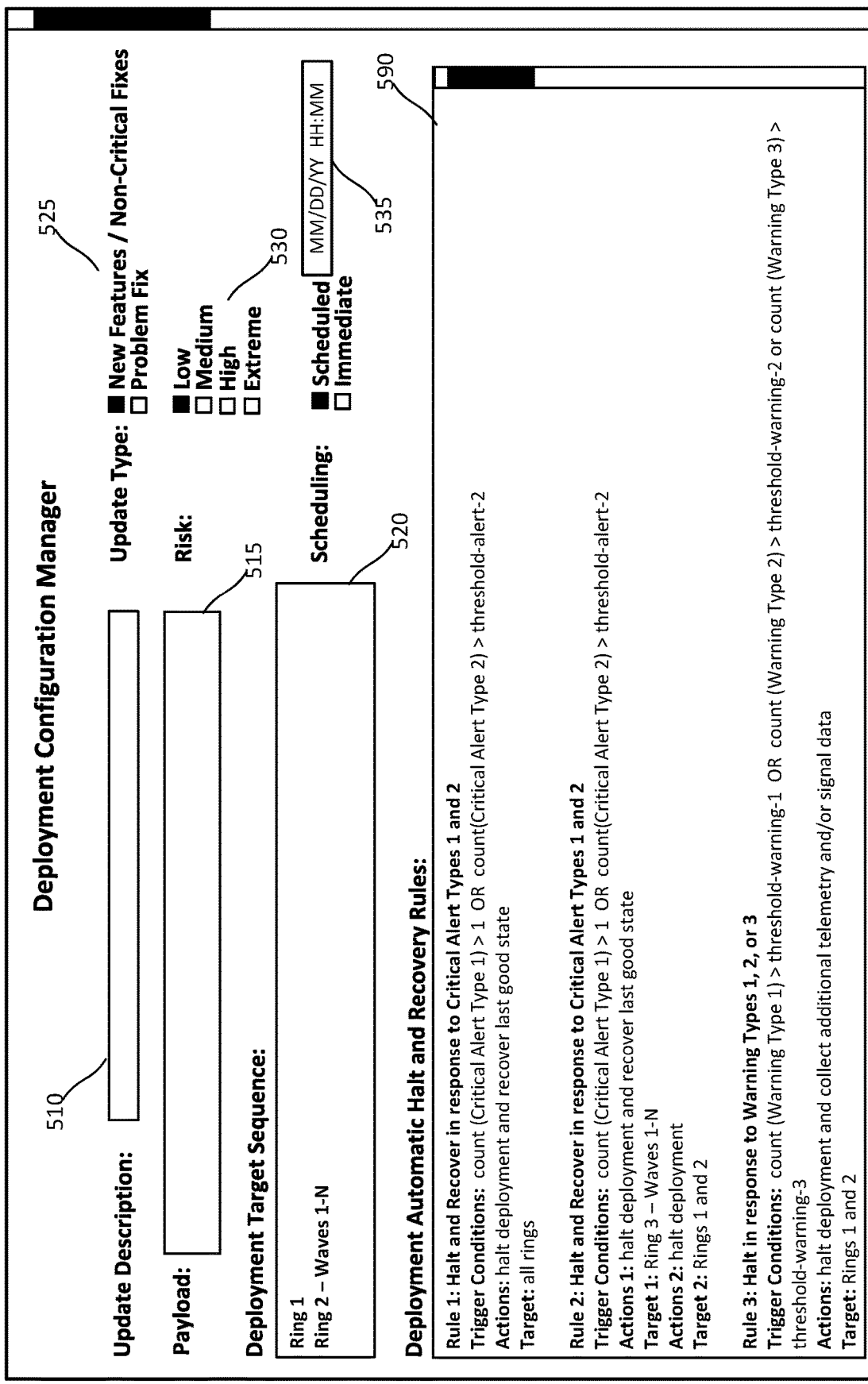
FIG. 5 is a diagram of an example of a deployment configuration manager user interface which may be generated by the deployment configuration interface unit of the cloud-based service shown in FIG. 1.

The deployment configuration interface unit 155 is configured to provide a user interface, such as the deployment configuration manager user interface 505, shown in FIG. 5. The deployment configuration interface unit 155 is configured to enable an authorized user to configure various parameters of the deployment and deployment halt and recovery rules that define actions to be taken when specified conditions occur in response to the update being deployed on the cloud-based service. The deployment configuration interface unit 155 is configured to store the parameters of the deployment and the deployment halt and recover rules in the update deployment datastore 130. The update deployment datastore 130 is a persistent datastore that is configured to store information associated with the configuration of and execution of deployments.

The telemetry and signal collection and processing unit 140 is configured to collect telemetry, log, and alert data that is generated by various components of the cloud-based services. The engineers that design and implement these components include code and/or scripts that generates the telemetry, log, and alert data to provide information regarding the performance of these components, to alert support staff of problems with these components that may require intervention, and to capture information that may be used to diagnose problems with these components. The telemetry, log, and alert data or a portion thereof may be stored in the telemetry and signals information datastore 145. The telemetry, log, and alert data may include many thousands or even millions of entries over a short period of time. Therefore, the telemetry and signals information datastore 145 may store a subset of the telemetry, log, and alert data received that may be indicative of a problem with components of the cloud-based service 110. The telemetry and signals information datastore 145 may also process the telemetry, log, and alert data received to create a more concise summary of the information included in the telemetry, log, and alert data received.

The deployment monitoring and control unit 135 is configured to monitor the telemetry, log, and alert data collected by the telemetry and signal collection and processing unit 140 relevant to an update being deployed. The deployment monitoring and control unit 135 determines whether any of the conditions associated with the deployment halt and recovery rules associated with the deployment have been satisfied and executes the actions to be taken when the specified conditions occur. These actions may include halting the deployment of the update to additional components of the cloud-based service 110. These actions may include restoring the components that have been updated for all or a portion of the components that have been updated. In some implementations, the rules may indicate that the update is to remain deployed to one or more rings of the ring deployment plan defined for the cloud-based service 110. This approach may be used in some instances where the additional telemetry, log, and alert data may be collected from one or more test environments. These test environments may be internal to the enterprise or may include a selected set of users who have agreed to test updates to the cloud-based service 110. These users may elect to participate in this testing in exchange for receiving access to new features and/or fixes before these features and/or fixes are released to a wider audience of users in the userbase of cloud-based service 110.

The deployment monitoring and control unit 135 may generate halt and recovery commands to components of the cloud-based service 110 that are currently executing processes associated with the deployment of the update. The deployment monitoring and control unit 135 may also update the update deployment datastore 130 to suspend scheduled processes associated with the deployment of the update. For example, deployment of the update may still be scheduled for one or more rings of the ring deployment plan, and the records associated with the deployment can be updated to indicate that the deployment has been halted to prevent the update deployment unit 125 from sending additional deployment commands and or packages associated with the scheduled processes that have not yet been initiated.

Figure 2:
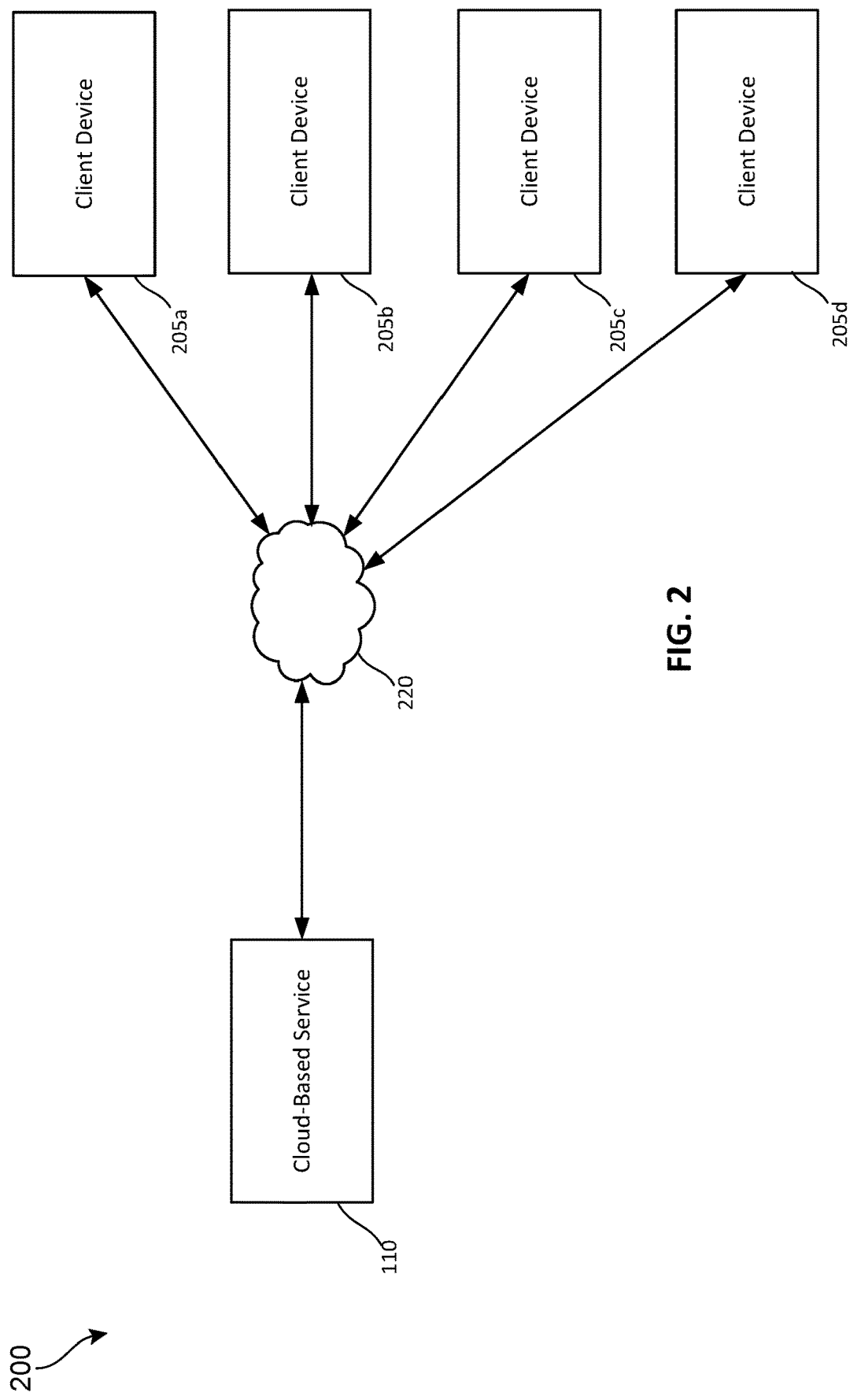
FIG. 2 is a diagram showing an example computing environment in which the cloud-based service shown in FIG. 1 may be implemented.

FIG. 2 is a diagram showing an example computing environment 200 in which the cloud-based service shown in FIG. 1 may be implemented. The computing environment 200 may include the cloud-based service 110 that implements the techniques for monitoring and controlling the deployment of updates in cloud-based services for improved reliability of the cloud-based services described herein. The example computing environment 200 may also include one or more client devices, such as the client devices 205a, 205b, 205c, and 205d. The client devices 205a, 205b, 205c, and 205d may communicate with the cloud-based service 110 via the network 220 to utilize the services provided by the cloud-based service 110. The network 220 may be a dedicated private network and/or the combination of public and private networks commonly referred to as the Internet.

In the example shown in FIG. 2, the cloud-based service 110 is implemented as a cloud-based service or set of services. These services may include, but are not limited to, applications for creating, consuming, and/or modifying content, file storage and management platforms, collaboration and communications platforms, and other types of software as a service. The cloud-based service 110 may include numerous servers, network devices, storage elements and other components to support the various services that are provided by the cloud-based service 110. For example, the cloud-based service 110 may include one or more collections of computer servers, referred to as a server farm, that are configured to provide computational and/or storage resources for at least a portion of the services provided by the cloud-based service 110. The server farm may be configured to provide fail-over protection so that if a computer server within the server farm experiences a failure, the tasks assigned to that server are handed off to another computer server within the farm. The server farm may also be configured to such that one or more machines may be taken offline temporarily to facilitate updates to the software and/or configuration data of the servers. Other architectures are also possible, and the deployment configuration information for deploying an update to the cloud-based service 110 accounts for the specific architecture and configuration of the components thereof. Furthermore, the cloud-based service 110 may also include other hardware and software to support various processes and services that support and maintain the components of the cloud-based service 110.

In some implementations, the update deployment management functionality described as being implemented by the cloud-based service 110 may instead be implemented as a separate service (not shown in FIG. 1) that is configured to handle the executing the deployment, monitoring the status of the deployment, and halting the deployment and/or taking remedial actions in response to the occurrence of certain conditions on behalf of the cloud-based service 110 and/or other such services. In such an implementation, the deployment policy and generation and execute functionality may be offered as another cloud-based service.

The client devices 205a, 205b, 205c, and 205d (referred to collectively as client device 205) are computing devices that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 2 includes four client devices, other implementations may include a different number of client devices that may utilize the cloud-based service 110. Furthermore, in some implementations, some features of the services provided by the cloud-based service 110 may be implemented by a native application installed on the client device 105, and the native application may communicate with the cloud-based service 110 over a network connection to exchange data with the cloud-based service 110 and/or to access features implemented on the cloud-based service 110.

Figure 3:
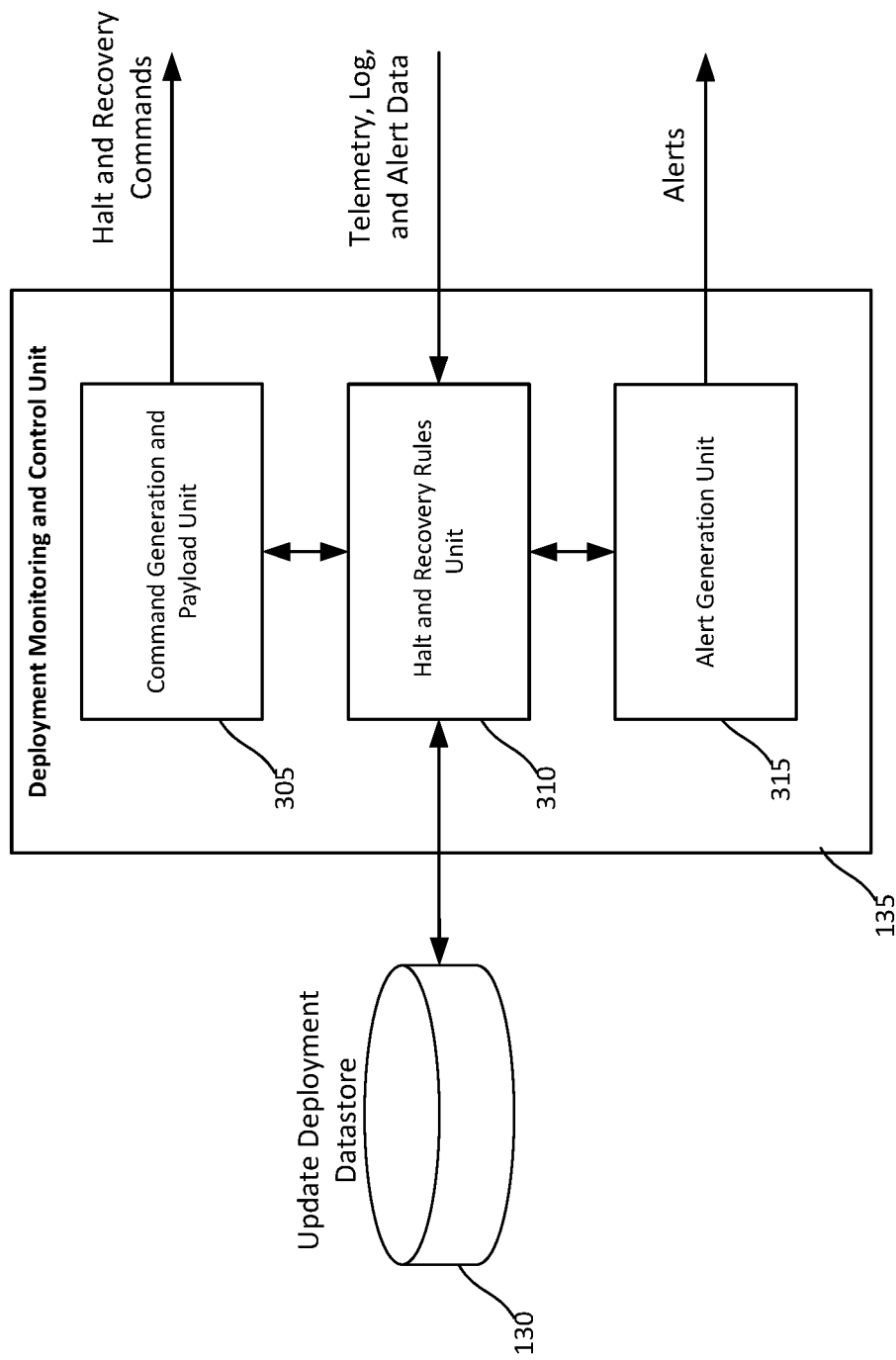
FIG. 3 a diagram showing an example deployment monitoring and control unit of the cloud-based service shown in FIG. 1.

FIG. 3 a diagram showing an example deployment monitoring and control unit 135 of the cloud-based service shown in FIG. 1. The deployment monitoring and control unit 135 includes a command generation and payload unit 305, a halt and recovery rules unit 310, and an alert generation unit 315. The command generation and payload unit 305 is configured to generate halt and recovery commands to various components of the cloud-based service 110 to halt the deployment of an update in response to an indication from the halt and recover rules unit 310 that the deployment of the update needs to be halted. The command generation and payload unit 305 may also be configured to send recovery commands to components of the cloud-based service 110 to restore a last known good version of the software and/or configuration data to the components of the cloud-based service 110 to which the update which experienced problems was deployed.

The halt and recovery rules unit 310 is configured to obtain the automatic halt and recovery rules associated with the update from the update deployment datastore 130. The halt and recovery rules unit 310 monitors the telemetry, log, and alert data collected by the telemetry and signal collection and processing unit 140. The halt and recovery rules unit 310 monitors this data to determine whether any of the trigger conditions associated with the automatic halt and recovery rules have been satisfied and performing the actions associated with the halt and recovery rules for which the trigger actions have been satisfied. Additional details of the halt and recovery rules are provided in the examples which follow. The halt and recovery rules unit 310 provides a means for automatically responding to problems associated with an update that is being deployed to reduce the impact on the user experience and improve the reliability of the cloud-based service 110.

The alert generation unit 315 is configured to generate alerts that notify an engineer or other user of problems that require user intervention. While the halt and recovery rules unit 310 is configured to automatically address many of the issues that may arise while deploying an update. However, certain events may occur that require human intervention. A halt and recovery rule may specify the trigger conditions that indicate such an event has occurred, and the action or actions taken may indicate that an alert is be generated. The halt and recovery rules unit 310 may provide alert information, including recipient information, information describing the event that has occurred the requires human intervention, and/or other information to the alert generation unit 315, and the alert generation unit 315 generates and send the alert. The alert may be sent via email, text message, and/or via other means. The alert may also be stored in the telemetry and signals information datastore 145.

FIG. 4 is a diagram showing a representation of a ring configuration 410 for deploying updates on a cloud-based architecture, such as that of the cloud-based service 110 shown in FIG. 1. Each ring may be associated with a predetermined number of users of the services provided by the cloud-based service 110. The number of users associated with each subsequent ring may be increased until the entire userbase has access to the updates that are being deployed. The number of rings associated with a particular deployment may depend upon the specific update to be deployed, the architecture of the cloud-based service 110, the risk associated with the specific update, and/or other factors that will be discussed in detail in the example which follow. As discussed in the preceding examples, the deployment monitoring and control unit 135 of the cloud-based service 110 may be configured to analyze telemetry, log, and alert data associated with the updated software and/or user feedback data indicative of the performance of the updates as the updates are deployed to each ring. The deployment monitoring and control unit 135 of the cloud-based service 110 may halt further deployment of the updates in response to the telemetry data and/or the user feedback data indicated that the updates are not operating as expected based on the telemetry, log, and alert data satisfying one or more conditions of the automatic halt and recovery rules associated with the deployment of the update. The update deployment unit 125 of the cloud-based service 110 may be configured to expand the rollout to the next ring in response to the telemetry data and/or user feedback indicating that the updates appear to be operating correctly.

Each ring may include a subset of servers and/or other components onto which the updates are deployed to provide the selected subset of users associated with each ring that are provided the updates. Furthermore, rings earlier in the sequence of rings may include users that are specially selected for initial testing of the updates. For example, users associated with a company or other organization that provides the cloud-based service 110, and employees or other users associated with the company or organization may be included in the original ring or the earlier rings in the sequence.

The ring configuration 410 includes two rings 415 and 425. In this non-limiting example configuration, the first ring 415 is associated with users in pre-production environments in which the updates may be tested by users before deploying the updates to a production environment associated with the second ring 425 in which users who are customers of the organization are provided access to the updates. In this example, the first ring 415 is associated with an internal group of users associated with the organization. These users may include members of the development team, testing team, and/or others who have been selected as a first set of users to receive and utilize the update. The client devices 205a, 205b, 205c, and 205d of the users and/or components of the cloud-based service 110 may provide telemetry data. The users themselves may be prompted to provide by the cloud-based service 110 to provide feedback on the update. This telemetry data and/or the user feedback may be analyzed to determine whether the updates are operating as expected. The update deployment unit 125 of the cloud-based service 110 may halt the deployment to the subsequent rings of the ring configuration 210 in response to determining that the updates are not operating as expected. Otherwise, the update deployment unit 125 may continue with the deployment process by deploying the updates to the second ring 425.

In the example shown in FIG. 4, updates are rolled out by the update deployment unit 125 first users associated with the pre-production environment before rolling out the updates to the users associated with the production environment. In this example, the organization has many employees who are also users of the services provided by the cloud-based service 110. For example, the first ring 415 in this example may include approximately 20,000 users associated with the organization. The preproduction environment in this example may be implemented on a separate server and/or sets of servers than the production environment, and the updates may initially be deployed to the server or servers associated with the preproduction environment. In other implementations, the same server or set of servers may provide services to both the preproduction and production environments, and users are directed to the appropriate version of the software based on the group with which the users are associated. Telemetry, log, and alert data may be collected from components of the cloud-based service 110 and user data may be collected from the users associated with the first ring 415, and the deployment monitoring and control unit 135 of the cloud-based service 110 may halt the deployment to the second ring 425 of the ring configuration 410 in response to determining that the updates are not operating as expected. This determination by determining whether the trigger conditions associated with the automatic halt and recovery rules associated with the deployment have been satisfied. Otherwise, the deployment process may continue with the update deployment unit 125 of the cloud-based service 110 deploying the updates to the second ring 425.

The second ring 425 includes users that are using a production version of the software. Thus, the second ring 425 includes users that are outside of organization and are customers who subscribe to the services provided by the cloud-based service 110. The second ring 425 may include a very large number of users. In this example, the second ring 425 may include millions or even billions of users. Thus, the second ring 425 may be further subdivided into waves, and each wave includes a subset of the users that make up the second ring 425. These waves may be used to gradually roll out the updates out to full userbase and to provide another opportunity to collect and analyze telemetry data, alert data, log data, and/or user feedback from a broader userbase before deploying the updates to all users.

The waves may be selected in any of different ways. In some implementations, users may be subdivided randomly into several waves to reduce the number of users from the second ring 425 for whom the updates are being deployed at one time. In other implementations, the waves may be based on a priority associated with the user. For example, some users may be provided with early release of new features and updates. In such an implementation, users having a first priority may be associated with the first wave, users having a second priority may be associated with the second wave, and users having a third priority may be associated with the third wave. In this example, only the second ring 425 was subdivided into a set of waves. However, more than one ring may be subdivided in this manner depending upon the size of the userbase, complexity, and risk associated with the deployment. Furthermore, whereas this example shows three rings, other implementations may utilize a different number of rings based on the size of the userbase, complexity, and risk associated with the deployment. The techniques provided can monitor the performance of the update at each of waves and may initiate halt and/or recovery operations in response to the telemetry data, alert data, log data, and/or user feedback received in a similar manner as may be undertaken for each of the rings.

More complex and/or risky updates may be deployed at a slower rate to fewer users for each ring or wave. The code tends to become much more stable as the code is deployed to each of the rings. If a problem occurs, however, the rollout is halted, and a fix may be deployed to those components of the cloud-based service 110 and/or the client device 105 to which the updates were deployed. This approach ensures that changes are rolled out gradually to the userbase and are tested and stabilized before being deployed across the full userbase.

FIG. 5 is a diagram of an example of a deployment configuration manager user interface 505 which may be generated by the deployment configuration interface unit of the cloud-based service shown in FIG. 1. The user interface 505 enables a user to set up a new deployment of an update and/or modify the parameters of an existing update. The deployment configuration information entered or modified using the user interface 505 is stored in the update deployment datastore 130.

The user interface 505 includes a description field 510 in which the user may enter a description of the update. The payload field 515 provides a means for the user to specify the software and/or configuration files to be deployed with the update. The payload field 515 may associated each payload item with a target component of the cloud-based service 110 on which the payload item is to be deployed. The deployment target sequence field 520 may specify an order in which the deployment process should proceed when deploying the update to the components of the cloud-based service 110. In the example shown in FIG. 5, the target sequence specifies an order of the rings to which the update is to be deployed. In other implementations, a separate user interface may be provided that permits a user to define a ring deployment plan that specifies an order in which updates are to be deployed to components of the cloud-based service 110.

The user interface 505 also includes update type radio buttons 525 that allow the user to select whether the update is associated with a new feature or non-critical fixes or is associated with a problem fix that is more critical. The user interface 505 also includes risk radio buttons that allow the user to define how risky a particular update may be relative to other updates. A lower risk update is less likely to impact the user experience of the userbase or is likely to impact a small number of users. A higher risk update is likely to impact a large percentage of the userbase and may impact critical features of the services provided by the cloud-based service 110. The user interface 505 includes scheduling radio buttons 535 that allow the user to select whether the update is to be deployed immediately or scheduled for deployment at a future date and time.

An automatic halt and recovery rules pane 590 provides means for the user to define a set of halt and recovery rules that define actions to be taken automatically taken by the deployment monitoring and control unit 135 when specified conditions occur in response to the update being deployed on the cloud-based service. The halt and recovery rules enable a user to define a flexible plan that enables the deployment monitoring and control unit 135 to automatically respond to various types of events based on the occurrence of certain trigger conditions. These conditions are representative of certain types of problems associated with the performance of the update being deployed.

The user interface 505 may provide means for storing the halt and recovery rules defined by a user to the update deployment datastore 130. The user interface 505 may provide tools that enable a user to select from the predefined rules stored in the update deployment datastore 130 when setting up a new deployment of an update and/or modifying the parameters of an existing update. The user interface 505 is also configured to permit the user to modify these predefined rules and/or to create new halt and recovery rules.

The halt and recovery rules provide a flexible means for identifying and automatically various types of issues that may arise during the deployment of an update to the cloud-based service 110. The user may create halt and recovery rules that address various types of problems that may occur during the deployment of an update and define actions to be taken automatically in response to these problems. Each rule is associated with a rule description, one or more trigger conditions, one or more actions to be performed in response to the trigger conditions being satisfied, and one or more target components of the cloud-based service 110 on which the actions are to be performed. The one or more trigger conditions may be based on a number of factors. In some implementations, the halt and recovery rules may take into account information obtained by analyzing the telemetry data, log data, and/or alert data as well as other information provided via the user interface 505, such as but not limited to the risk associated with the update, whether the update is to provide new features or is intended to fix a problem, the day and/or time which the update is performed, and/or other factors. The actions to be performed in response to the trigger conditions being satisfied are also configurable. These actions may include but are not limited to stopping one or more processes associated with the deployment process, initiating one or more processes to restore the software and/or configuration data of one or more components of the cloud-based service 110 to a last known good version, and/or perform other actions in response to the occurrence of certain trigger conditions. As discussed in the preceding examples, the occurrence of these conditions can be determined based on the telemetry data, log data, and/or alert data that has been collected as the build deployed to components of the cloud-based service 110 according to the deployment plan.

In some implementations, the user may deploy halt and recovery rules that address detected problems in specific components or logical groupings of components of the cloud-based service 110, such as back-end components, front-end components, and/or middle-layer components of the cloud-based service 110. The rules halt and recovery rules and the actions specified for these rules may be tailed to the specific type of problems that may occur for each of these components or logical groupings of components.

The rules may be configured based on the age and stability of the codebase associated with the update and the risk associated with the update. An older and more stable code base is typically less likely to experience problems that result from an update. Problems with the codebase have likely been identified and fixed for applications or services that have been deployed to a production environment for a longer period of time than a newly introduced application or service for which the code may not have yet been fully utilized in production environment. The halt and recovery rules for a more stable codebase may include fewer trigger conditions that would cause the deployment to be halted and/or recovery actions taken to restore a last known working version of the software and/or configuration data. In contrast, the halt and recovery rules for a newer application or service with a potentially less stable codebase may have halt and recover rules that are defined to halt the deployment if less severe trigger conditions occur so that these problems may be resolved before the update is deployed.

The halt and recovery rules may also be customized for an update based on when the update is being deployed. If the update is being deployed during days and/or times when fewer users are typically utilizing the applications or services associated with the update, the halt and recovery rules may be less strict regarding the types of trigger events that would cause the deployment to be halted and/or for recovery to a last known good version to be performed.

The halt and recovery rules may also be customized according to the types of usage that associated with an issue that arose in response to the deployment of the update. Active usage signals indicative of a user taking some action in an application provided by the cloud-base service 110 may be associated with rules that are more likely to halt the deployment and initiate recovery, because such usage signals are indicative of the user experiencing a problem with an application or service that negatively impacts the user experience. In contrast, passive usage signals indicative of some component of the cloud-based service 110 experiencing a problem may be associated with rules that are less likely to halt the deployment and initiate recovery. For example, a scheduled process on the cloud-based service 110 may experience an error condition once the update has been deployed. Such situations may not directly impact the user experience, and the deployment may not be halted to provide an opportunity to collected additional telemetry data, log data, and/or alert data that may help to diagnose a problem with the update.

The halt and recovery rules can be customized to provide a flexible end-to-end solution for monitoring the deployment of updates in a cloud-based system and for taking appropriate remedial actions in response to problems occurring in response to the deployment of the update. A technical benefit of this approach is that problems with the update can be detected before they impact the entire userbase of the cloud-based service. Consequently, the cloud-based service 110 is more stable and provides an improved user experience.

Figure 6:
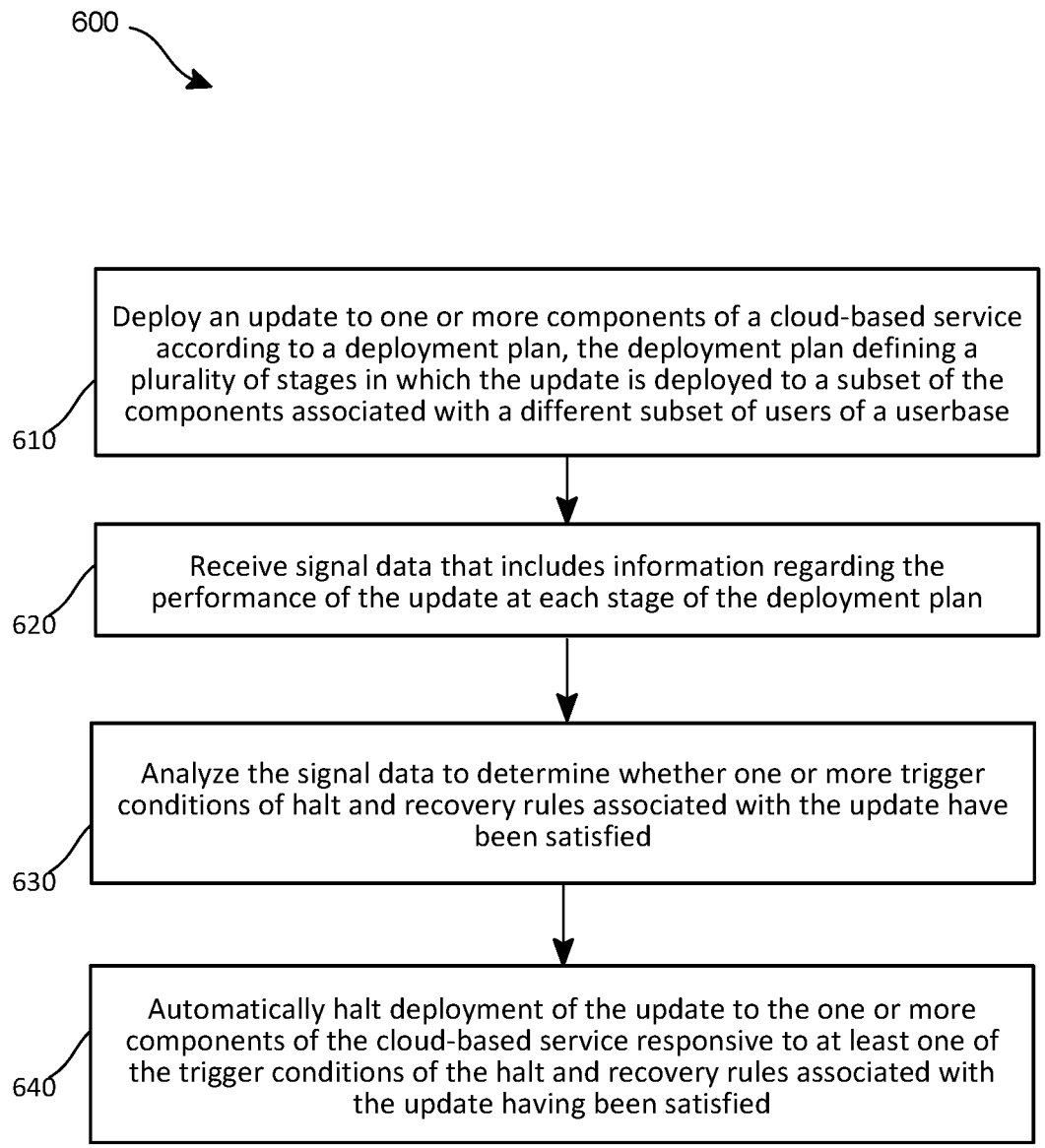
FIG. 6 is a flow diagram of an example process for monitoring and controlling the deployment of an update to a cloud-based service.

FIG. 6 is a flow chart of an example process 600 for managing the deployment of updates to a cloud-based service 110. The process 600 may be implemented by the deployment monitoring and control unit 135 of the cloud-based service 110. The process 600 may be used to halt the deployment of an update to components of the cloud-based service 110 in response to telemetry data, log data, and/or alert data indicating that one or more trigger conditions associated with halt and restore.

The process 600 may include an operation 610 of deploying an update to one or more components of a cloud-based service according to a deployment plan. The deployment plan defines a plurality of stages in which the update is deployed to a subset of the components associated with a different subset of users of a userbase. As discussed in the preceding examples, the deployment monitoring and control unit 135 may implement a ring-based deployment plan or other deployment plan for deploying an update to components of the cloud-based service 110.

The process 600 may include an operation 620 of receiving signal data that includes information regarding the performance of the update at each stage of the deployment plan. As discussed in the preceding examples, telemetry data, log data, and/or alert data may be collected and analyzed from components associated with the update to determine whether these components are operating correctly once they have been updated.

The process 600 may include an operation 630 of analyzing the signal data to determine whether one or more trigger conditions of halt and recovery rules associated with the update have been satisfied. As discussed in the preceding examples, the deployment plan for an update may be associated with a set of halt and recovery rules that are associated with specific trigger conditions.

The process 600 may include an operation 640 of automatically halting deployment of the update to the one or more components of the cloud-based service responsive to at least one of the trigger conditions of the halt and recovery rules associated with the update having been satisfied. When a trigger condition associated with a rule is satisfied, the actions associated with that rule are automatically executed by the deployment monitoring and control unit 135. These actions may include halting the deployment of the update and restoring a last known good version of the software and/or configuration data that was modified as part of the update.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
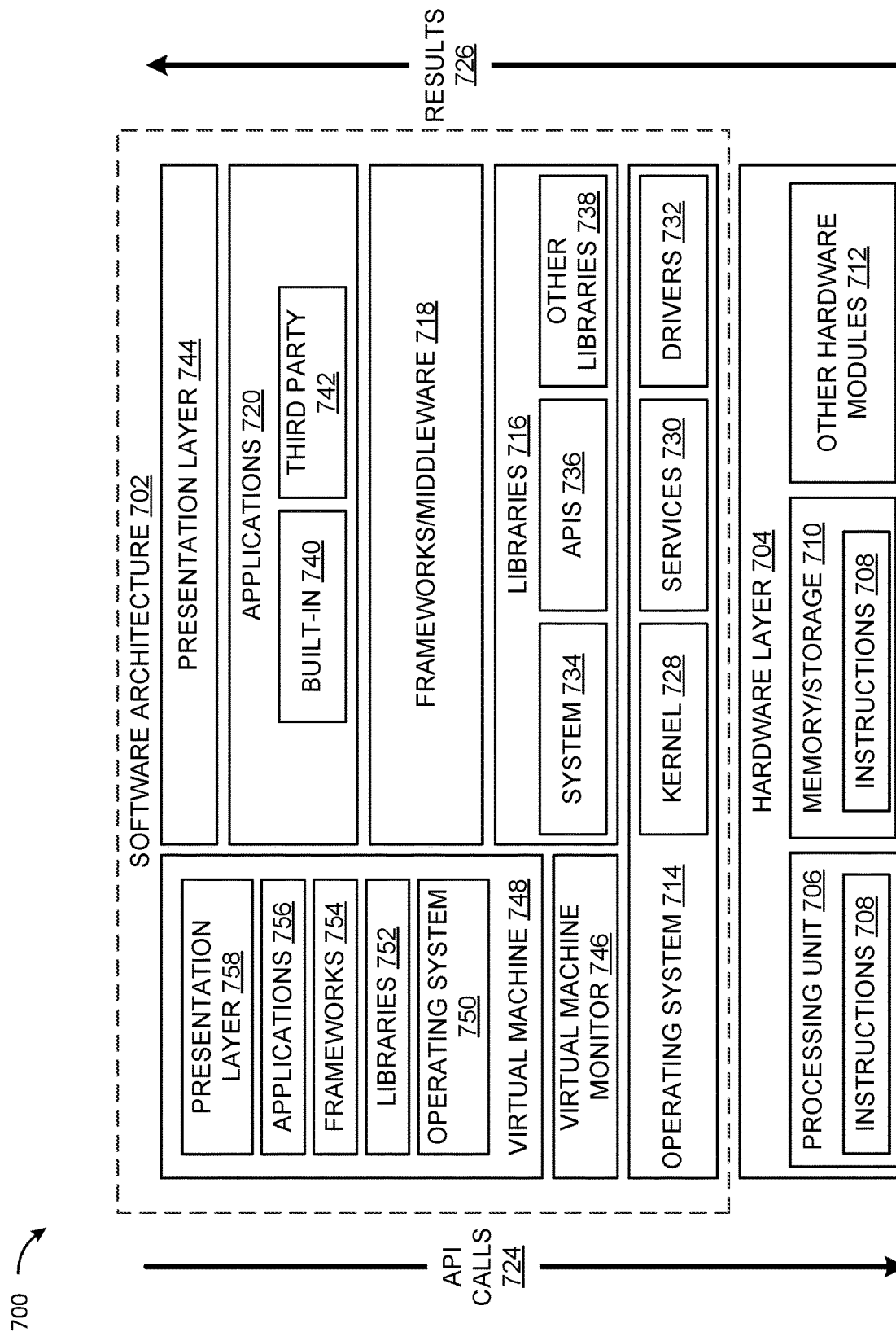
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/ modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
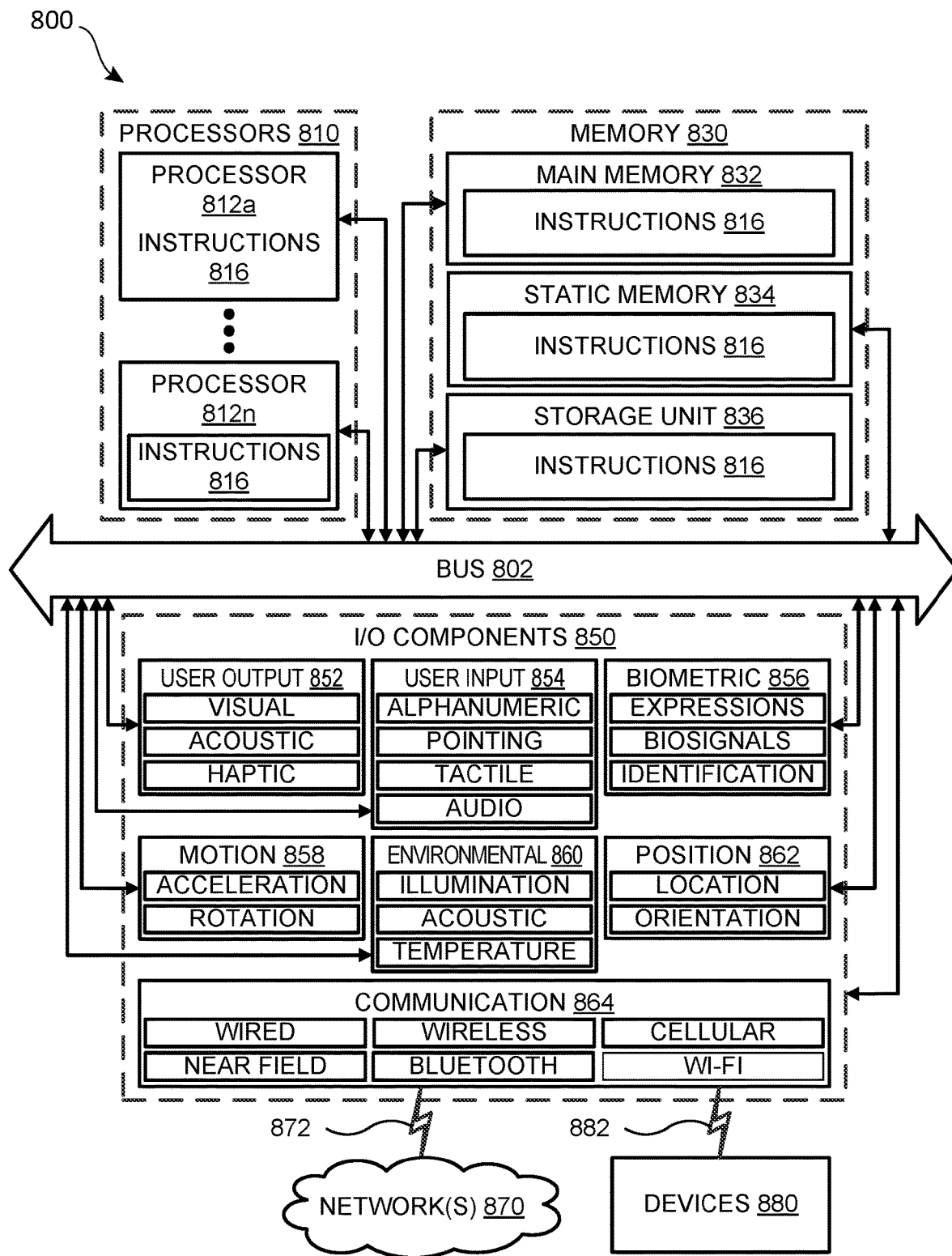
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
      deploying an update to one or more components of a cloud-based service according to a deployment plan using an update deployment unit of the cloud-based service, the deployment plan defining a plurality of stages in which the update is deployed to a subset of the components associated with a different subset of users of a userbase;
      receiving, at a telemetry and signal collection and processing unit via a network connection, signal data from the one or more components of the cloud-based service that includes information regarding a performance of the update at each stage of the deployment plan;
      analyzing the signal data using a deployment monitoring and control unit of the cloud-based service to determine whether one or more trigger conditions of halt and recovery rules associated with the update have been satisfied;
      automatically halting deployment of the update to first components of the one or more components of the cloud-based service associated with a subset of the plurality of stages of the deployment plan responsive to the deployment monitoring and control unit of the cloud-based service determining that at least one of the trigger conditions associated with the halt and recovery rules associated with the update having been satisfied;
      receiving, at the telemetry and signal collection and processing unit via the network connection, the signal data from second components of the cloud-based service associated with a second subset of the plurality of stages of the deployment plan; and
      analyzing the signal data using the deployment monitoring and control unit of the cloud-based service to determine a source of one or more problems associated with the update.

2. The data processing system of claim 1, wherein each halt and recovery rule is associated with one or more actions to be performed responsive to a respective trigger condition associated with the halt and recovery rule.

3. The data processing system of claim 1, wherein the signal data includes telemetry data, log data, and alert data generated by the components of the cloud-based service.

4. The data processing system of claim 1, wherein the machine-readable medium includes instructions configured to cause the processor to perform operations of:
   automatically restoring software, configuration data, or both, of the one or more components of the cloud-based service responsive to the at least one of the halt and recovery rules associated with the update having been satisfied.

5. The data processing system of claim 4, wherein automatically restoring the software, configuration data, or both, of the one or more components of the cloud-based service:
   automatically restoring the software, configuration data, or both, of the first components of the cloud-based service but not the second components of the cloud-based service.

6. The data processing system of claim 1, wherein the machine-readable medium includes instructions configured to cause the processor to perform operations of:

generating an alert indicating that an error occurred during the deployment of the update that could not be automatically resolved and requires intervention of a human operator.

7. A method implemented in a data processing system for managing deployment of updates to a cloud-based service, the method comprising:

deploying an update to one or more components of a cloud-based service according to a deployment plan using an update deployment unit of the cloud-based service, the deployment plan defining a plurality of stages in which the update is deployed to a subset of the components associated with a different subset of users of a userbase;

receiving, at a telemetry and signal collection and processing unit via a network connection, signal data from the one or more components of the cloud-based service that includes information regarding a performance of the update at each stage of the deployment plan;

analyzing the signal data using a deployment monitoring and control unit of the cloud-based service to determine whether one or more trigger conditions of halt and recovery rules associated with the update have been satisfied;

automatically halting deployment of the update to first components of the one or more components of the cloud-based service associated with a subset of the plurality of stages of the deployment plan responsive to the deployment monitoring and control unit of the cloud-based service determining that at least one of the trigger conditions associated with the halt and recovery rules associated with the update having been satisfied;

receiving, at the telemetry and signal collection and processing unit via the network connection, the signal data from second components of the cloud-based service associated with a second subset of the plurality of stages of the deployment plan; and analyzing the signal data using the deployment monitoring and control unit of the cloud-based service to determine a source of one or more problems associated with the update.

8. The method of claim 7, wherein each halt and recovery rule is associated with one or more actions to be performed responsive to a respective trigger condition associated with the halt and recovery rule.

9. The method of claim 7, wherein the signal data includes telemetry data, log data, and alert data generated by the components of the cloud-based service.

10. The method of claim 7, further comprising:

automatically restoring software, configuration data, or both, of the one or more components of the cloud-based service responsive to the at least one of the halt and recovery rules associated with the update having been satisfied.

11. The method of claim 10, wherein automatically restoring the software, configuration data, or both, of the one or more components of the cloud-based service further comprises:

automatically restoring the software, configuration data, or both, of the first components of the cloud-based service but not the second components of the cloud-based service.

12. The method of claim 7, further comprising:

generating an alert indicating that an error occurred during the deployment of the update that could not be automatically resolved and requires intervention of a human operator.

13. A machine-readable medium on which are stored instructions that, when executed, cause a processor of a programmable device to perform operations of:

deploying an update to one or more components of a cloud-based service according to a deployment plan using an update deployment unit of the cloud-based service, the deployment plan defining a plurality of stages in which the update is deployed to a subset of the components associated with a different subset of users of a userbase;

receiving, at a telemetry and signal collection and processing unit via a network connection, signal data from the one or more components of the cloud-based service that includes information regarding a performance of the update at each stage of the deployment plan;

analyzing the signal data using a deployment monitoring and control unit of the cloud-based service to determine whether one or more trigger conditions of halt and recovery rules associated with the update have been satisfied;

automatically halting deployment of the update to first components of the one or more components of the cloud-based service associated with a subset of the plurality of stages of the deployment plan responsive to the deployment monitoring and control unit of the cloud-based service determining that at least one of the trigger conditions associated with the halt and recovery rules associated with the update having been satisfied;

receiving, at the telemetry and signal collection and processing unit via the network connection, the signal data from second components of the cloud-based service associated with a second subset of the plurality of stages of the deployment plan; and analyzing the signal data using the deployment monitoring and control unit of the cloud-based service to determine a source of one or more problems associated with the update.

14. The machine-readable medium of claim 13, wherein each halt and recovery rule is associated with one or more actions to be performed responsive to a respective trigger condition associated with the halt and recovery rule.

15. The machine-readable medium of claim 13, wherein the signal data includes telemetry data, log data, and alert data generated by the components of the cloud-based service.

16. The machine-readable medium of claim 13, wherein further comprising instructions configured to cause the processor to perform operations of:

automatically restoring software, configuration data, or both of the one or more components of the cloud-based service responsive to the at least one of the halt and recovery rules associated with the update having been satisfied.

17. The machine-readable medium of claim 16, wherein automatically restoring the software, configuration data, or both, of the one or more components of the cloud-based service further comprises:

automatically restoring the software, configuration data, or both of the first components of the cloud-based service but not the second components of the cloud-based service.

* * * * *